Dec. 19, 1922.

O. A. WIRKKALA.
LUBRICATING SYSTEM FOR LOGGING BLOCKS.
FILED AUG. 8, 1921.

1,439,349.

Oscar A. Wirkkala, INVENTOR.

BY David E. Lain,
ATTORNEY.

Patented Dec. 19, 1922.

1,439,349

UNITED STATES PATENT OFFICE.

OSCAR A. WIRKKALA, OF ROME TOWNSHIP, WHATCOM COUNTY, WASHINGTON.

LUBRICATING SYSTEM FOR LOGGING BLOCKS.

Application filed August 8, 1921. Serial No. 490,573.

*To all whom it may concern:*

Be it known that I, OSCAR A. WIRKKALA, a citizen of the United States, and a resident of the township of Rome, in the county of Whatcom and State of Washington, have invented a new and useful Lubricating System for Logging Blocks, of which the following is a specification.

My invention relates to improvements in lubricating systems for logging blocks, and the object of my invention is to provide a simple system of lubrication for logging blocks that will supply ample lubricant at all times of use notwithstanding the high speed and heavy pressures under which these blocks must at times operate in modern skyline logging.

Figure 1:
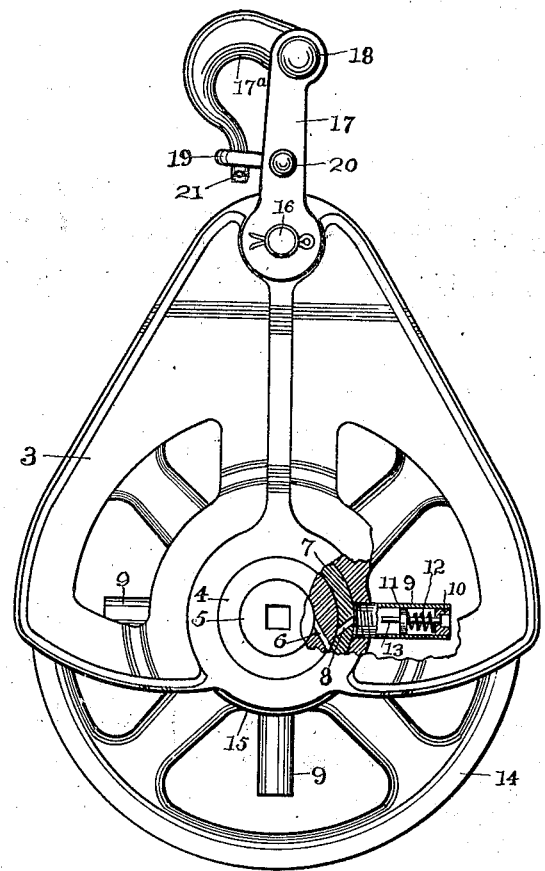
Figure 2:
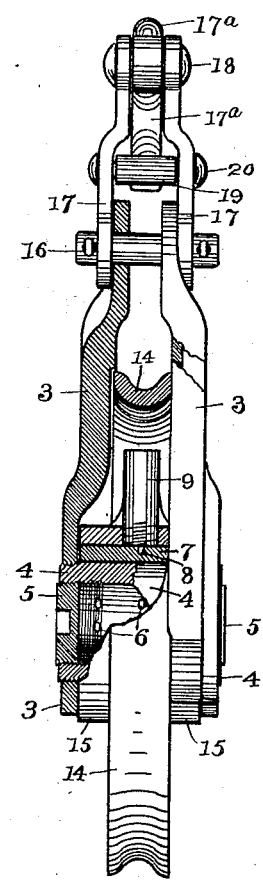

I attain this object with the mechanism illustrated in the accompanying sheet of drawings in which Figure 1 is a front elevation of a logging block to which my lubricating system is applied, and Fig. 2 is a side elevation of Fig. 1.

Similar characters refer to similar parts throughout. Certain parts are broken away in order to show other parts hidden thereby. In both of Figs. 1 and 2 parts are shown in section on a medial, vertical plane.

More particularly: 3, 3 are the block's plates.

4 is a hollow pin for a sheave axle.

5, 5 are screw caps in each end of hollow pin 4 which is tapped to permit said plugs to be screwed well within the same.

6, 6 are holes through the walls of pin 4 all inclined as shown in Fig. 1.

7 is a bushing fixed in sheave hub 15 and mounted on pin 4 for revolution.

8, 8 are four holes through bushing 7 each inclined as shown in Fig. 1.

9, 9 are four grease tubes, each engaged in a radial, tapped hole through the walls of hub 15 registering with one of holes 8 through the walls of bushing 7.

10 is a screw plug fitted to engage in the tapped outer end of each of grease tubes 9.

11 is a disc piston in each of grease tubes 9 having a central hole through which rod 13 projects.

12 is a spring reacting between cap 10 and disc 11 to cause said disc to bear on the grease in said cup or tube.

13 is a rod fastened centrally in cap 10 and on it slides disc 11.

14 is a cable sheave having hub 15 mounted for revolution on pin 4.

16 is a pin through registering holes in the upper ends of plates 3. Pin 16 is retained in place by cotter pins in holes near its ends.

17, 17 are clevis bars mounted on pin 16.

17ª is a finger hook mounted for rotation on riveted pin 18 through the upper end of clevis bars 17.

19 is a keeper ring having a hub mounted for rotation on a riveted pin 20 through clevis bars 17 and adapted to engage the end of finger hook 17ª.

21 is a cotter pin in a hole near the end of finger hook 17ª to retain keeper ring 19 engaged with said hook.

In operation: Grease tubes 9 and hollow axle pin 4 are all kept supplied with grease. In tubes 9 this grease is forced through holes 8 by pressure from springs 12. In the hollow pin the grease is forced through holes 6 by pressure from screw plugs 5. The flow of grease through holes 6 and 8 is further aided by the oblique direction of the same. When sheave 14 revolves in a clockwise direction suction is caused at the outlets of holes 6 which promotes the flow of grease therefrom. Similarly, when said sheave revolves in a counter-clockwise direction suction is caused at the outlet ends of holes 8 which promotes flow of grease therefrom. Because of this force of suction, which is augmented by the oblique direction of said grease holes, and the entry of grease on the bearing surfaces from both the interior and exterior of said surfaces, harder grease can be used with my system of lubrication than is otherwise safe, and the grease cups require filling less frequently.

Having thus disclosed my invention, what I claim is new and desire to secure by Letters Patent is,—

1. In the lubricating system of a pulley block in combination, a sheave axle having a lubricant receptacle within and a conduit from said receptacle to the bearing surface of said axle, the terminal of said conduit inclined to said bearing surface, a sheave mounted on said axle for revolution having a conduit therein terminating at the bearing surface of said sheave bearing, the terminal of said conduit inclined to said bearing surface, and a lubricant receptacle connected to said sheave tributary to said conduit therein.

2. In combination, the hollow axle of a pulley block having conduits through its walls and a threaded interior, said conduits inclined to the bearing surface of said axle, a threaded plug engaged in each end of said axle interior, a sheave mounted for revolution on said axle having tapped holes in its hub and conduits leading obliquely from said holes to the bearing surface of said sheave, and a lubricant receptacle engaged in each of said holes in said hub.

3. In a lubricating system in combination, an axle, means adapted to cause lubricant to flow from within said axle to its journal-bearing surface at an angle therewith, a wheel mounted for revolution on said axle, and means to cause lubricant to flow from within said wheel to said journal-bearing surface at an angle therewith and in a direction intersecting that of the flow of said lubricant from within said axle.

4. In a lubricating system in combination, a journal bearing, means adapted to cause lubricant to flow from within said journal bearing to the bearing surface thereof and obliquely therewith, a journal mounted for revolution on said bearing, and means adapted to cause lubricant to flow from within said journal obliquely with the surface thereof and in a direction intersecting the direction of lubricant flow from within said journal bearing.

OSCAR A. WIRKKALA